United States Patent
Lindblom et al.

(10) Patent No.: US 8,548,894 B2
(45) Date of Patent: Oct. 1, 2013

(54) COMPUTER SYSTEM AND METHOD FOR CALCULATING MARGIN

(75) Inventors: Albert Samuel Lindblom, Huddinge (SE); Bengt Jansson, Danderyd (SE)

(73) Assignee: OMX Technology AB, Stockholm (SE)

( * ) Notice: Subject to any disclaimer, the term of this patent is extended or adjusted under 35 U.S.C. 154(b) by 465 days.

(21) Appl. No.: 12/726,392

(22) Filed: Mar. 18, 2010

(65) Prior Publication Data

US 2010/0332370 A1 Dec. 30, 2010

Related U.S. Application Data

(60) Provisional application No. 61/220,087, filed on Jun. 24, 2009.

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | |
|---|---|---|---|
| 6,018,721 A * | 1/2000 | Aziz et al. | 705/36 R |
| 2005/0137956 A1 | 6/2005 | Flory et al. | |
| 2007/0055589 A1 * | 3/2007 | Jameson | 705/29 |
| 2007/0118453 A1 | 5/2007 | Bauerschmidt et al. | |
| 2008/0183612 A1 | 7/2008 | Frankel | |
| 2009/0037249 A1 * | 2/2009 | Edens et al. | 705/10 |
| 2009/0313162 A1 * | 12/2009 | Flory et al. | 705/37 |

OTHER PUBLICATIONS

Singapore Search Report and Written Opinion mailed Jan. 13, 2012 in corresponding Singapore Application No. 201003068-2.

* cited by examiner

*Primary Examiner* — Jessica Lemieux
(74) *Attorney, Agent, or Firm* — Nixon & Vanderhye P.C.

(57) ABSTRACT

The present invention relates to a computer system, computerized method and computer program product for calculating margin requirements in a more efficient way. In particular it relates to margin calculations for being used by clearing house in order to optimize calculation of margin requirements.

12 Claims, 8 Drawing Sheets

COMPUTER SYSTEM AND METHOD FOR CALCULATING MARGIN

This application claims priority to U.S. Provisional Application No. 61/220,087 filed Jun. 24, 2009, the entire contents of which is hereby incorporated by reference.

FIELD OF THE INVENTION

The present invention relates to margin calculations associated with computerized market places. In particular it relates to a computer system and method for calculating optimal margin requirements in clearing systems.

BACKGROUND OF THE INVENTION

Computerized market places have in the last few years undergone major changes and a lot of money has been invested in research and development in order to improve the systems. However even though the current systems in use are very sophisticated there exist needs to even further improve computerized systems associated with computerized market places. The computer systems associated with computerized market places are for example the central exchange system where the actual matching of orders takes place, clearing and settlement systems for handling post trade activities and trading systems that are the systems that traders uses in order to send in orders to the central exchange system.

In order to trade different financial instruments such as stocks, options, futures, forwards and so forth the members connected to the market place must typically be associated with at least one clearing account in a clearing house that keeps collateral. The reason for this is that the clearinghouse works as an intermediary between the seller and the buyer and in order to avoid that any one of the parties of a trade defaults so that an agreed trade can not be executed the clearinghouse needs collateral stored in an account. Usually this collateral is stored in a margin account and can be divided into initial margin and variation margin. The initial margin shall cover heavy market movements of the positions and the variation margin is the positions' accumulated profit and loss, which is typically subject to a daily mark to market. The initial margin can be calculated using different positions in different financial instruments and by netting positions.

A problem that the clearing houses are facing is the issue of making sure that there is enough initial margin in order to cover heavy market movements for a desired number of lead days but also that the margin requirement is not over conservative since this will restrain the market.

Commercial available margin models such as SPAN, OMS II and TIMS calculate initial margin per contract. Correlations between these contracts are handled differently between these models but in general all are ill suited for markets that exhibit very strong correlation. Furthermore calculating initial margin per contract is not optimal for certain instruments such as FX forwards and interest swaps since the total risk can be closed out by a combination of several different contracts. Calculating initial margin per contract will therefore give over conservative margin requirements for these types of portfolios.

Hence there is a need for an improved method and system for providing margin requirements.

BRIEF DESCRIPTION OF THE INVENTION

Thus it is an object of the present invention to provide a solution for an improved clearing house.

It is a further object of the present invention to provide a solution that is able to handle multi currency products within the same margin system run.

It is a further object of the present invention to provide a solution that is able to calculate an optimal margin requirement for instrument positions in an account.

It is a further object of the present invention to provide a solution that is able to calculate an optimal margin requirement for an account associated with FX forwards.

It is a further object of the present invention to provide a solution that is able to calculate an optimal margin requirement for an account associated with interest rate swaps.

It is a further object of the present invention to provide a solution that is able to calculate an optimal margin requirement for an account associated with multiple instrument types.

It is a further object of the present invention to provide a solution that is able to netting contracts in a new way.

At least one of the above objects is obtained by the present invention as set out in the appended claims.

According to a first aspect of the invention this is achieved by a computer system for calculating margin requirements, the computer system comprising a memory comprising one or more accounts, the accounts comprising one or more positions comprising contracts, a processor associated with the memory, wherein the computer system is configured such that the processor divides the contracts in the memory into cash flows.

Letting the computer system break up the individual contracts into cash flows has the advantage that margin amounts can be lowered without being less conservative when managing the risk of e.g. a clearing house.

In one embodiment the computer system can be configured to netting the different cash flows of a contract against other cash flows of other contracts. This has the advantage that a more optimal margin requirement can be achieved.

Furthermore the computer system further can be configured to treat each cash flow separately. This has the advantage that a more flexible system can be obtained.

In another embodiment the computer system can further be configured to net currency exposures across future value dates for the cash flows of the contracts. This has the advantage that margin can be calculated on contracts and/or positions having a risk exposure.

In one embodiment the computer system is configured to handle multi currency products within the same margin system run.

The computer system can be a computer system configured such that it can be used for a clearing house computer system.

In a further embodiment the contracts can be divided up into their relevant currencies.

In accordance with second aspect of the invention, the above object is obtained by a computerized method for calculating margin requirements implemented on a computer system, the computer system comprising a memory comprising contracts and a processor associated with the memory, the method comprising the steps of:

identifying the contracts in the memory, breaking up each individual contract into cash flows.

By letting the computerized method breaking up the individual contracts into cash flows has the advantage that margin amounts can be lowered without being less conservative when managing the risk of e.g. a clearing house.

In one embodiment the computerized method can comprise the steps of:

netting each cash flow of a contract against other cash flows of other contracts.

By concentrating the calculations on sub parts of the contracts the quite cumbersome set up of a correlation structure in the existing margin models can be avoided. This will facilitate the understanding, and acceptance, of the model both externally and internally for e.g. a clearing house.

The computerised method for calculating margin requirements can comprise the steps of:
list future payment flow in a table,
calculate net present valued payments,
apply a scanning range parameter to each net present valued payments, and
calculate margin requirements.

In a third aspect of the invention, the above object is obtained by a computer program product according to any-of the previous described embodiments, the computer program product being stored on a data carrier.

These and other aspects of the invention will be apparent from and elucidated with reference to the embodiments described hereinafter.

DESCRIPTION OF PREFERRED EMBODIMENTS

Figure 1:
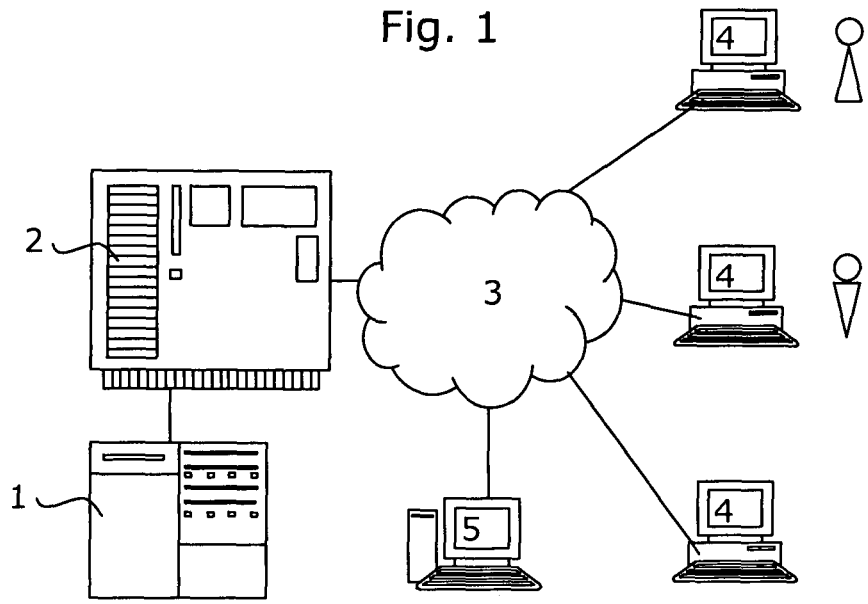
FIG. 1 illustrates a computer system and network wherein the present invention can be implemented.

FIG. 1 illustrates a computerised exchange system 2 connected to a computerised clearing system 1. The computerised exchange system is connected to trading terminals 4 and an algotrader 5 via a computer network 3.

Figure 2:
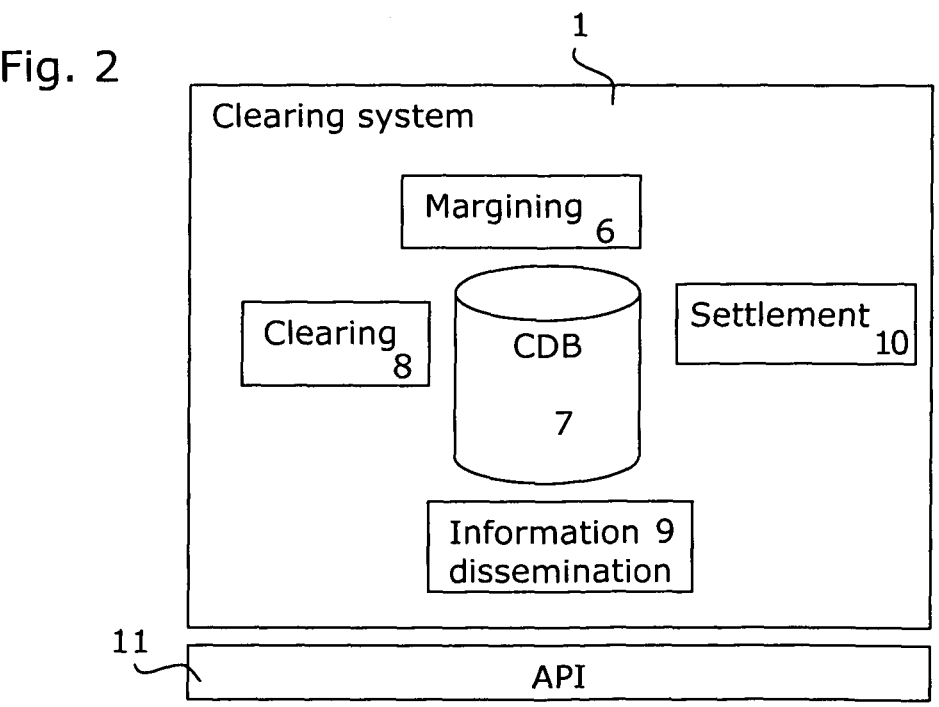
FIG. 2 illustrates a clearing system wherein the present invention can be implemented.

FIG. 2 illustrates a clearing system 1 comprising a number of subsystems. The clearing system comprising a:
margining subsystem 6 for calculating margin requirements for the participants of the clearinghouse, i.e. its members and its clients. The collateral each participant must provide reflects the total financial risk to which the participant is exposed when trading in e.g. options and futures contracts.
common database subsystem 7 for storing information and parameters necessary to set up and configure the clearing system.
clearing subsystem 8 for storing trades, maintaining accounts and positions, control all event and tasks connected to the product definitions, calculate fees, settlement and deliveries, provide data for statistical analysis and provide clearing data information to other subsystems and to external users over the API.
information dissemination subsystem 9 for handling information received from external marketplaces and information providers. It also creates reports with historical information after a trading day is over.
settlement subsystem 10 for handling payments, business transactions and accounting details. It may also be used for liquidity analysis and reconciliation.
application programming interface (API) 11 for providing an open, consistent interface to participant and third party applications accessing available service functions in the system.

Figure 9:
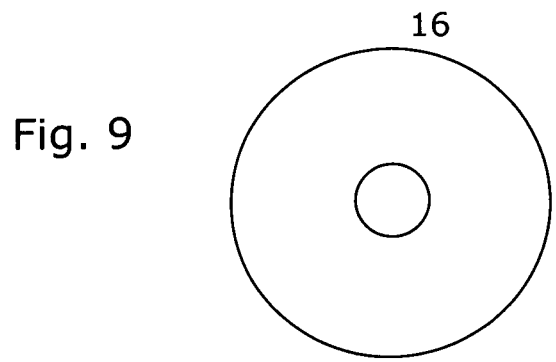
FIG. 9 illustrates computer readable medium for storing computer code.

FIG. 9 illustrates a computer program product such as a DVD for storing executable computer code according to the invention.

Below will the present invention be disclosed together with a number of examples.

FX forwards are different than stock forwards since they will always result in cash flows in two directions. This is because one currency is always exchanged for another currency. There are two main requirements on a margin model for FX forwards, firstly; the margin model must give enough margins i.e. the margin requirement shall contain the portfolio's accumulated profit and loss plus additional margin to cover heavy market movements for the desired number of lead days. Secondly the margin model must consider the portfolio as a whole. This implies that the model shall net between several positions that combined closes the future payments in one currency.

Background and Formulas
FX Outright Forward
A FX Outright Forward is an agreement to, at the value date, exchange an amount of the fixed currency for an amount of the variable currency to a contracted exchange rate. The name convention is Fixed Currency/Variable Currency. The variable currencies are USD, EUR and NOK in the examples below.
EUR/USD
GBP/EUR
SEK/NOK
A FX Outright Forward may be priced using Equation 1.
Definitions
t—is the time to the value date expressed in the defined discount base.
FR—is the forward exchange rate for the given currency pair and for time t.
SR—is the spot exchange rate for the given currency pair.
$r_{CURF}$—is the risk free interest rate for time t in the fixed currency.
$r_{CURV}$—is the risk free interest rate for time t in the variable currency.

$$FR = SR \cdot e^{(r_{CURF} - r_{CURV}) \cdot t} \tag{1}$$

Spot FX
A Spot FX is a FX Outright Forward with value date t=T+2. Here T stands for the trading date of the Spot FX contract.
FX Swap
A FX swap can always be broken up into two FX forward contracts. The forwards contracts can further be broken up as described later in this document.
PnL Bought Contracts
For bought Spot FX contracts and bought FX Outright Forward contracts the profit and loss (expressed in the variable currency of the FX pair) on day t is calculated according to Equation 2.
Definitions
PnL—is the profit and loss of the position.
CR—is the contracted exchange rate.
Fix(t)—is the fixing exchange rate on day t for the relevant FX contract.
Q—is the quantity (expressed in the fixed currency).

$$PnL = Q \cdot (\text{Fix}(t) - CR) \tag{2}$$

Example
Consider a bought Spot FX trade.
Currency pair: EUR/SEK
Date, t: 2009-01-08
Quantity, Q: 1 000 000 (EUR)
Contracted exchange rate, CR: 11,0 (SEK per EUR)
Fixing exchange rate, Fix(t): 11,1 (SEK per EUR)

$$PnL = Q \cdot (Fix(t) - CR) = 1\,000\,000 \cdot (11,1 - 11,0) = 10\,000 \text{ SEK}.$$

PnL Sold Contracts

For sold Spot FX contracts and sold FX Outright Forward contracts the profit and loss, PnL, (expressed in the variable currency of the FX pair) on day t is calculated according to Equation 3.

$$PnL = Q \cdot (CR - Fix(t)) \qquad (3)$$

Present Value

The present value in a given currency of a future payment in the same currency is calculated according to Equation 4.

Definitions t—is the time to the value date expressed in the defined discount base.

$r_{CUR}$—is the risk free interest rate for time t in the given currency.

N—is the amount that will be paid or received on the value date.

P—is the present value of N.

$$P = N \cdot e^{(-r_{CUR} \cdot t)} \qquad (4)$$

No Arbitrage Assumption

The exchange rates for all currency pairs are usually not independent of each other. In order to avoid an arbitrage situation Equation 5 must be fulfilled.

Definitions

CURA stands for Currency A.
CURB stands for Currency B.
CURC stands for Currency C.
$R_{CURX/CURY}$ is either the spot or the forward exchange rate for the currency pair CURX/CURY.

$$R_{CURA/CURB} = R_{CURC/CURB} / R_{CURC/CURA} \qquad (5)$$

Margin Calculations

According to a prior art margin method, such as the OMS II method, the margin requirement is calculated per position. Further, with the prior art margin methods it is currently only technically possible to define a market with one currency. Hence, with the prior art margin method OMS II, one FX market would have to be defined per variable currency. All relevant currencies could later be defined as underlying instruments in each FX market as described by the example below.

Example: EUR/SEK

The Spot FX currency pair EUR/SEK would be defined as a spot contract of EUR in the SEK FX market.

OMS II would only be able to handle correlation within one currency. Hence, OMS II will give over conservative margin requirements for portfolios that have netted their future payments by buying and selling several positions with different variable currencies (for example bought USD/JPY, bought EUR/USD and sold EUR/JPY).

The present invention solves this problem. The computer implemented margin calculation method (NOMX CFM) of the present invention preferably calculates the initial margin per currency. This procedure is to divided into the steps described below.

Variation Margin

A variation margin will be calculated per position and this will be equal to that position's PnL calculated according to Equation 2 and Equation 3. If desired, it will be possible to perform net present value calculations of the PnLs when calculating the variation margin.

The total variation margin for one account will be the sum of the PnLs for all positions in that account. The total variation margin will be given per currency.

Initial Margin

The initial margin is calculated in four steps.

Step A—Cash Flow Table

List all future cash flows in a table were the columns represent the currency and the rows represent the value date. This table is called the Cash Flow Table (refer to Table 1). Positive and negative payments on the same value date and in the same currency will be netted in this step.

TABLE 1

The Cash Flow Table.

| Date | Currency | | | |
|---|---|---|---|---|
|  | USD | SEK | ... | EUR |
| 2008-12-17 (T + 2) | 200 | −800 | ... | −90 |
| ... | ... | ... | ... | ... |
| 2009-01-14 (T + 30) | 100 | −700 | ... |  |

It should be noted that the closing fixing rates will be used when the FX contracts are fit into the Cash Flow Table. The market value of the future payments in the Cash Flow Table will therefore be equal to zero.

Step B—Net Present Valued Payments

A new row is created in the Cash Flow Table. Each column in this row contains the net present value, NPV, of the future cash flows in that currency. If no interest rate shifts are considered the present values will be calculated using Equation 4. For most currencies the present value calculations will only be performed to T+2. This is because the closing fixing rates will be spot rates and hence most of the times have value date T+2. The number of days that the present value calculations are performed to will be configurable in the system

TABLE 2

A new row, containing the net present values, is created in the Cash Flow Table.

| Date | Currency | | | |
|---|---|---|---|---|
|  | USD | SEK | ... | EUR |
| 2008-12-17 (T + 2) | 200 | −800 | ... | −90 |
| ... | ... | ... | ... | ... |
| 2009-1-14 (T + 30) | 100 | −700 | ... | ... |
| Net Present Valued Payments | $200 + 100 \cdot e^{-r_{USD} \frac{30-2}{360}}$ | $-800 - 700 \cdot e^{-r_{SEK} \frac{30-2}{360}}$ | ... | −90 |

For FX Outright Forwards there is a risk related to shifts in the interest rate curves. This risk is accounted for in NOMX CFM by simulating different shifts in the interest rate curves. NOMX CFM is flexible and each exchange may choose their own way to stress the yield curves. This text present three different methods to stress the yield curve. In the preferred embodiment of the present invention (NOMX CFM) the interest rate shifts will be performed by the "Rolling Value Method".

Historical Simulations

In this method a number of actual yield curve shifts between an appropriate numbers of days are stored in a database (let us say 500 days for the discussion). One way of doing this is to calculate the percentage shift for each day in the interest rate curves and store that number. When the NPV are to be calculated the interest rate curve of today is shifted in the 500 possible different ways and Equation (4) is used to calculate a NPV per currency. The interest rate curve that produces the lowest NPV would then be used and that would also be the NPV to use as the margin figure.

Pros:

The advantage is that the correlation pattern of the past 500 days is automatically included in the calculations, Principal Component Analysis In this method the movements of the interest rate curves are analyzed and the largest independent movements are identified. For most markets this is A parallel shift of the curve.

A change in the slope of the curve (pivoting).

A change in the curvature (bending the curve in the ends).

Since these movement generally explain most of the movement of an interest rate curve these factors can be used to calculate margins with a reasonable amount of confidence. The different movements are independent of each other which mean that one can calculate margins by having parameters define each movement. When the NPV are to be calculated the interest rate curves of today are shifted according to their principal components and Equation (4) is used to calculate a NPV per currency. The interest rate curve that produces the lowest NPV would then be used and that would also be the NPV to use as the margin figure.

Pros:

The yield curves will always look reasonable (no spikes or saw tooth shapes). It will be possible to introduce correlation between yield curves in different currencies with this method.

Rolling Value Method

In this method the swap forward curve is shifted in a rolling fashion starting with the cash flow furthest away.

Definitions $CC_{i,j}$ is the value of all future cash flows in currency i later than date j discounted back to date j.

$r_{i,j,j+1}$ is the risk free interest rate in currency i for the time period from date j to date j+1.

$\Delta r_{i,j,j+1}$ is the interest rate shift risk parameter. It shall represent the risk of shifts in $r_{i,j,j+1}$.

$t_j$ is the time to date j given in the defined discount base.

Algorithm $$CC_{i,j} = C_{i,j} + CC_{i,j+1} \cdot e^{((r_{i,j,j+1}+sign(cc_{i,j+1})\Delta r_{i,j})t_{j,j+1})} \quad (6)$$

$$NPV_i = \sum_j CC_{i,j} \quad (7)$$

Pros:

The rolling value method is robust and it will find the worst possible interest rate curves for the portfolio. The yield curves will show periods with increased numbers and periods with decreased number depending on the complete portfolios exposure. It will be possible to stress the less liquid and/or more volatile parts of the yield curves with a higher risk parameter compared to the interest rate curves' more liquid and/or less volatile parts. It will be straight forward to introduce correlation between different interest rate curves in the same currency.

Step C—Spot Exchange Rates Stressing

A scanning range parameter is applied to all net present valued payments. The scanning range parameter should be expressed in percentage and it shall cover market movements of the currency compared to the account's base currency for the desired number of lead days.

The scanning range parameter is applied on the spot fixing exchange rate of the given currency compared to the base currency of the account in conjunction with converting the net present value in that currency to the base currency of the account. The scanning range parameter shall be applied according to Equation (8)-Equation (9).

Definitions

SRP is the scanning range parameter.

$Fix(t)_i$ is the fixing spot exchange rate of currency i compared to the base currency of the account.

$P_i$ is the net present valued payments for currency i given in currency i.

$P_i^{base}$ is the net present valued cash flows for currency i given in the base currency of the account.

Algorithm

If $P_i > 0$ $$P_i^{base} = (1-SRP) \cdot Fix(t)_i \cdot P_i \quad (8)$$

If $P_i < 0$ $$P_i^{base} = (1+SRP) \cdot Fix(t)_i \cdot P_i \quad (9)$$

It will be possible to consider correlation between different currencies in this step. This will be applied through the window method which is the same algorithm as is used in OMS II to account for correlation benefits between different underlying instruments.

Since the market value for the future payments in the Cash Flow Table is equal to zero the initial margin i.e. the margin added by the risk parameters is equal to the sum of all converted net present cash flows.

$$\text{Initial margin} = \Sigma P_i^{base} \quad (10)$$

FX Settlement Margin

The variation margin contains the PnL of all FX contracts accumulated as a netted variation margin amount from all positions, no matter of their value date. This might not be suitable for future styled customers since part of their pledged collateral might be used for settlement at the value date.

It will therefore be possible to incorporate a FX settlement margin to NOMX CFM. The FX settlement margin is preferably defined per currency and it is equal to the total losses in that currency for all positions with value date less than T+a configurable amount of days. If FX settlement margin is used then it may be pledged preferably as cash in the relevant currencies.

Margin Presentation and Collateral Handling

The following margin information is preferably presented to the customers.

PnL per position (currency pair), calculated according to Equation 2 and Equation 3.

Variation margin per currency. This will be the net present value of the combined PnL:s in that currency. These net present valued calculations are preferably performed with the unadjusted interest rate curves.

Total margin requirement. This will be the total margin requirement (initial and variation margin). In this calculation the interest rate curves will have been adjusted with the configured method.

The margin requirement may be covered with any collateral approved by the market place, such as cash or any type securities may be used.

It should be noted that for participants that are configured to use FX settlement margin the margin presentation and collateral handling may be different.

Computer Implemented Price Server

General

One fundamental prerequisite for absorbing counterparty risk in a clearing house is the ability to price all positions of the counterparts to the clearing house. In very general terms the price server is a market maker computer application that collects information over a computer network from various price sources, such as from other computerized exchanges, banks and from other information server systems. Information regarding derivatives, equities, interest rate, deals and so forth may be collected, and with these building blocks the price server is able to construct best effort pricing of other less liquid (or even non traded) instruments.

According to a preferred embodiment of the present invention the price handling will be needed in order to be able to calculate accurate variation margin as well as initial margin.

Exchange Rates and Interest Rate Curves

A price carrier method will be applied to compute accurate exchange rates. The computerized exchange will in real time or on an hourly basis (at minimum) provide the computerized price server with at least the following information through a gateway over the computer network.

The spot exchange rates for all currencies towards the USD.

The interest rates per currency in predefined times, $t_{CURA,1}=r_{CURA,1}$, $t_{CURA,2}=r_{CURA,2}$ etc.

The computerized price server is configured to handle the above information in the following way.

The price server will take the spot exchange rates for each currency towards the USD and use Equation (5) to calculate the spot exchange rates for all possible currency pairs.

The price server will take the given interest rates and interpolate a linear interest rate curve per currency. The price server will then use Equation (1) to calculate the theoretical forward exchange rates for each possible currency pair and time.

These spot exchange rates, linear interpolated interest rate curves and theoretical calculated forward exchange rates may be forwarded and used when calculating variation margin and initial margin.

It should be noted that it will also be possible for the clearing operation personnel to manually enter the spot exchange rates and interest rate curves through the Graphical user interface (GUI) to the clearing system.

Margin Calculation Examples

An Example NOMX CFM VS OMS II

Portfolio

Consider a portfolio according to Table 3. All contracts are Spot FX contracts and hence have value date T+2.

TABLE 3

A portfolio with three different Spot FX contracts.

| Portfolio 2 | Ccy pair | Amount | Rate |
|---|---|---|---|
| Buy | USD/JPY | 1 000 000 | 90.0700 |
| Buy | EUR/USD | 703 977 | 1.4205 |
| Sell | EUR/JPY | 703 978 | 127.9444 |

Suppose the fixing rates and the risk parameters are as described in Table 4.

TABLE 4

Margin data at the end of day T.

| Scanning Range Parameter | (all 4% currencies) |
|---|---|
| USD/JPY: Fix(T) | 90.0700 |
| EUR/USD: Fix(T) | 1.4205 |
| EUR/JPY: Fix(T) | 127.9444 |
| Value Date | 2 |
| Base currency | EUR |

It should be noted that since the contracted rates are equal to the fixing rates all positions have market value equal to zero. The margin requirement calculated by OMS II and NOMX CFM will therefore only contain the initial margin.

OMS II

OMS II will calculate a margin requirement per position. This will be calculated according to Equation 11 and Equation 12.

Definitions

Q is the quantity.

CR is the contracted exchange rate.

Fix(t) is the fixing exchange rate on day t.

SRP is the scanning range parameter.

Bought Contracts $$\text{Margin}=(\text{Fix}(T)\cdot(1-SRP)-CR)\cdot Q \quad (11)$$

Sold Contracts $$\text{Margin}=(CR-\text{Fix}(T)\cdot(1+SRP))\cdot Q \quad (12)$$

USD/JPY

Margin=(90,0700·0,96−90,0700)·1 000 000=−3 602 800 *JPY*.

EUR/USD

Margin=(1,4205·0,96−1,4205)=−40 000 *USD*.

EUR/JPY

Margin=(127,9400−127,9444·1,04)=−3 602 678 *JPY*.

Margin requirement

The total margin requirement (converted into EUR with the closing fixing exchange rates) will be equal to −84 478 EUR.

NOMX CFM

In NOMX CFM the Spot FX contracts are broken up into their relevant currencies.

Step A—Cash Flow Table

The Cash Flow Table will be created.

USD

The netted payments will be equal to 1 000 000−703 977·1, 4205=0 USD.

EUR

The netted payments will be equal to 703 977,47−703 978=−−0,53 EUR.

JPY

The netted payments will be equal to −90 070 000+90 070 067=67 JPY.

TABLE 5

The Cash Flow Table.

| Date | Currency | | |
|---|---|---|---|
| | USD | EUR | JPY |
| T + 2 | 0 | −0.53 | 67 |

Step B—Net Present Valued Payments

Since all payments are for value date T+2 there is no need to perform the present value calculations.

TABLE 6

Net Present Valued Payments.

| Date | Currency | | |
|---|---|---|---|
| | USD | EUR | JPY |
| T + 2 | 0 | −0.53 | 67 |
| Net Present Valued Payments | 0 | −0.53 | 67 |

Step C—Spot Exchange Rates Stressing

The scanning range parameter is applied in conjunction with converting the net present valued payments into the base currency of the account (EUR).

TABLE 7

Net Present Valued Payments in EUR.

| Date | Currency | | |
|---|---|---|---|
| | USD | EUR | JPY |
| T + 2 | 0 | −0.53 | 67 |
| Net Present Valued Payments | 0 | −0.53 | 67 |
| Net Present Valued Payments (EUR) | 0 | −0.53 | 67 · 0.96/127.9444 = 0.51 |

The total margin requirement will be equal to the sum of all net present valued payments in EUR.

Margin requirement=−0.002 EUR.

Interest Swaps

The following example is aimed to describe a second embodiment wherein the present invention may be used, namely to calculate margins for interest rate swaps. NOMX CFM (short for NASDAQ OMX Cash Flow Margin) is a margin model designed by NOMX.

Preferably this method is implemented in a computer system such as a computer or server computer comprising a central processor, for executing the instructions that are associated with the method steps described in the following example.

According to a preferred embodiment NOMX CFM method calculates margin in the following steps.

Cash Flow Table

In the first step each instrument is broken up into its underlying cash flows and these are inserted into a cash flow table. The columns in this table represent each cash flow's currency and the rows represent each cash flow's value date. Positive and negative cash flows on the same value date, and in the same currency and with the same interest rate risk will be netted in this step.

TABLE 8

All future cash flows are inserted into a cash flow table.

| Date | Currency | | |
|---|---|---|---|
| | SEK | ... | USD |
| 2009-05-05 | SEK Cash Flow 1 | ... | USD Cash Flow 1 |
| ... | ... | ... | ... |
| 2012-05-05 | SEK Cash Flow X | ... | USD Cash Flow X |

Net Present Value Calculations

In the second step a net present value, NPV, of the future cash flows is calculated per currency. The yield curves are stressed when this calculation is performed. This text presents a rolling value method, a historical simulation approach and a principal component approach to the yield curve stressing. Each clearing house may however define and use their own method to stress the yield curves.

TABLE 9

A net present value of the future cash flow is calculated per currency.

| Date | Currency | | |
|---|---|---|---|
| | SEK | ... | USD |
| 2009-05-05 | SEK Cash Flow 1 | ... | USD Cash Flow 1 |
| ... | ... | ... | ... |
| 2012-05-05 | SEK Cash Flow X | ... | USD Cash Flow X |
| Net Present Value (NPV) | NPV(SEK Cash Flows) | ... | NPV(USD Cash Flows) |

Stressing of Spot Exchange Rates

In the third step each net present valued cash flow is converted into a margin base currency. The spot exchange rates are stressed in this conversion. The window method will be applied to account for correlation between different exchange rates.

It should be noted that if the NPV of the future cash flows are calculated with the unstressed yield curves and converted with the unstressed spot exchange rates, then the portfolio's market value is obtained in the margin base currency. However, when the NPV are calculated with the stressed yield curves and converted with the stressed spot exchange rates the margin requirement is obtained in the margin base currency.

Now an example on how the NOMX CFM method can be applied on IRS

Definitions

A generic Interest Rate Swap contract can be defined by the following set of parameters

[$N, Q, t_0, t_{end}, \Delta t_1, \Delta t_2, r_1, r_2, type_1, type_2, \Delta r_1, \Delta r_2, CUR_1, CUR_2, Bool FX$].

N is the nominal amount (expressed in $CUR_1$).

Q is the quantity of the swap trade.

$t_0$ is the start date of the swap.

$t_{end}$ is the end date of the swap.

$\Delta t_1$ is the interval between $r_1$'s generated cash flows.

$\Delta t_2$ is the interval between $r_2$'s generated cash flows.

$r_1$ is the first interest rate (given in percentage if it is a fixed interest or given as a string, for example 3M STIB, if it is a floating interest).

$r_2$ is the second interest rate (given in percentage if it is a fixed interest or given as a string, for example 3M STIB, if it is a floating interest).

$type_1$ is the type of the first interest rate (simple, compounded etc).

$type_2$ is the type of the second interest rate (simple, compounded etc).

$\Delta r_1$ is the number of basis points that the $r_1$ rate should differ from the $r_1$ fixing.

$\Delta r_2$ is the number of basis points that the $r_2$ rate should differ from the $r_2$ fixing.

$CUR_1$ is the currency for $r_1$.

$CUR_2$ is the currency for $r_2$.

Bool is a Boolean describing if the nominal amount will be exchanged at the final settlement.

FX is the agreed exchange rate for $CUR_1/CUR_2$.

EXAMPLES

Fixed-for-Floating One Currency

Consider a bought plain vanilla SEK fixed-for-floating rate swap, for example a two year swap of a fixed interest for floating 3M STIBOR. This could be defined as

[1 000 000, 1, 2009-05-05, 2011-05-05, 12M, 3M, −1%, 3M STIB, simple, simple, 0, 0, SEK, SEK, False, 1].

Fixed-for-Floating Two Currencies

Consider a sold USD/JPY fixed-for-floating rate swap, for example a ten year swap of a fixed interest in USD for floating JPY 3M LIBOR. This could be defined as

[1 000 000, 1, 2009-05-05, 2019-05-05, 12M, 3M, 1%, -JPY 3M LIBOR, simple, simple, 0, 0, USD, JPY, True, 120.19].

Floating-for-Floating One Currency

Consider a bought SEK floating-for-floating rate swap for example a five year swap of SEK 3M LIBOR+20 for 3M STIBOR+25. This could be defined as

[1 000 000, 1, 2009-05-05, 2014-05-05, 3M, 3M, -SEK 3M LIBOR, 3M STIBOR, simple, simple, 20, 25, SEK, SEK, False, 1].

Cash Flow Table

Yield Curves

In order to be able to price and calculate margins on interest rate swaps RIVA must be able to construct yield curves. The NOMX CFM adaptations to RIVA include an OMNET computer transaction in order to send pairs of dates, $t_i$, and interest rates, $r_i$, into RIVA. From this information RIVA will be able to linear interpolate an interest rate curve $r(t)$.

A preferred way is that the RIVA computer system collects the relevant swap zero rates from a third party vendor such as Reuters or Bloomberg, via computer communication means, and uses a linear interpolation of a swap zero curve, $r_z(t)$. RIVA can from $r_z(t)$ construct a swap forward curve $r_f(t)$. The formula used to construct $r_f(t)$ will of course look different depending on the type of interest rates and the discount base. In this text it is assumed that the swap zero rates are simple interest rates and that the discount base is actual/360.

Definitions $r_f(t_1,t_2)$ is the forward rate from $t_1$ to $t_2$.

$r_z(t_1)$ is the zero rate for time $t_1$.

$r_z(t_2)$ is the zero rate for time $t_2$.

$\Delta t_{ij}$ is the number of days between $t_i$ and $t_j$.

Formulas $$\left(1 + r_f(t_1, t_2) \cdot \frac{\Delta t_{12}}{360}\right) \cdot \left(1 + r_z(t_1) \cdot \frac{\Delta t_{01}}{360}\right) = \left(1 + r_z(t_2) \cdot \frac{\Delta t_{02}}{360}\right) \quad (13)$$

It should be noted that Equation (13) explicitly states that the following relation is valid.

$$\left(1 + r_f(t_2, t_3) \cdot \frac{\Delta t_{23}}{360}\right) \cdot \left(1 + r_f(t_1, t_2) \cdot \frac{\Delta t_{12}}{360}\right) = \left(1 + r_f(t_1, t_3) \cdot \frac{\Delta t_{13}}{360}\right) \quad (14)$$

Cash Flows of a Generic Swap

An interest rate swap is an agreement to exchange future cash flows in one or two currencies. An example of the future cash flows of a SEK fixed-for-floating rate swap is shown in FIG. 3.

Figure 3:
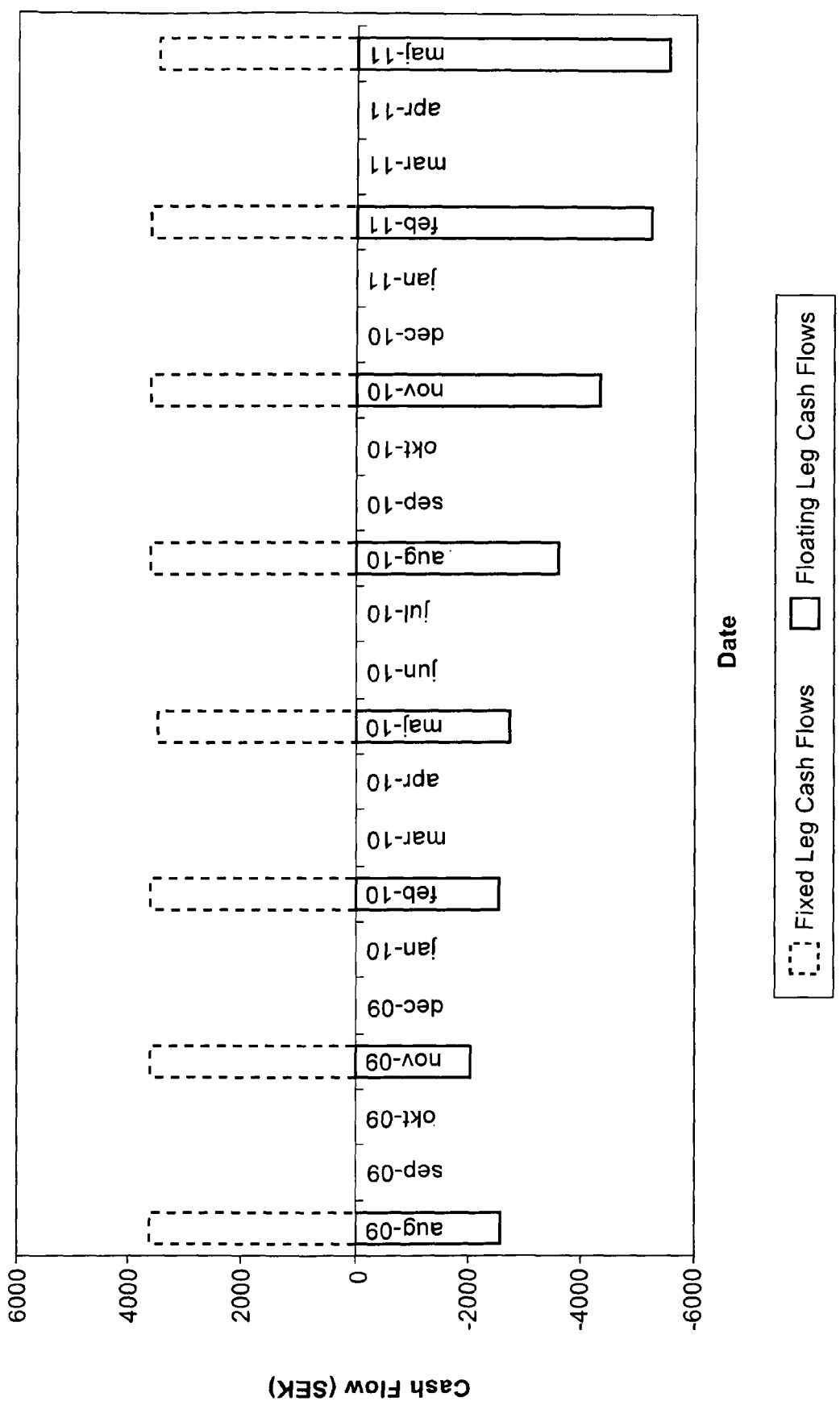
FIG. 3 illustrates generated cash flows of a SEK fixed-for-floating rate swap.

FIG. 3: The generated cash flows of a SEK fixed-for-floating rate swap.

Equation (15)-(18) can be used in order to insert a generic swap contract, defined by

[N, Q, $t_0$, $t_{end}$, $\Delta t_1$, $\Delta t_2$, $r_1$, $r_2$, $type_1$, $type_2$, $\Delta r_1$, $\Delta r_2$, $CUR_1$, $CUR_2$, Bool, FX], into the cash flow table.

It should be noted that the notional amount for $CUR_2$ is given by N·FX. Hence, when Equation (15)-(18) are used on the second leg of the swap contract N should be changed to N·FX.

Fixed Currencies

For all fixed currencies the cash flow table will be filled in according to the below logic.

$$\text{For } t_0 + i \cdot \Delta t_{ij} < t_{end} \quad (15)$$
$$\text{Cash\_Flow\_Table}_{t_0+i\cdot\Delta t_{ij}, CUR_j} = Q \cdot \frac{r_j \cdot \Delta t_{ij}}{360} \cdot N$$

$$\text{For } t_{end} \quad (16)$$
$$\text{Cash\_Flow\_Table}_{t_{end}, CUR_j} =$$
$$Q \cdot \frac{r_j \cdot \Delta t_{ij}}{360} \cdot \begin{cases} N & \text{if } Bool = \text{False} \\ (N+1) & \text{if } Bool = \text{True} \end{cases}$$

Floating Currencies

For all floating currencies the cash flow table will be filled in according to the below logic.

$$\text{For } t_0 + i \cdot \Delta t_{ij} < t_{end} \quad (17)$$
$$\text{Cash\_Flow\_Table}_{t_0+i\cdot\Delta t_{ij}, CUR_j} =$$
$$Q \cdot \frac{(r_{f,j}(t_0 + (i-1)\cdot\Delta t_{ij}, t_0 + i\cdot\Delta t_{ij}) + \Delta r_j) \cdot \Delta t_{ij}}{360} \cdot N$$

$$\text{For } t_{end} \quad (18)$$
$$\text{Cash\_Flow\_Table}_{t_{end}, CUR_j} =$$
$$Q \cdot \frac{(r_{f,j}(t_{end} - \Delta t_{ij}, t_{end}) + r_j) \cdot \Delta t_{ij}}{360} \cdot \begin{cases} N & \text{if } Bool = \text{False} \\ (N+1) & \text{A. if } Bool = \text{True} \end{cases}$$

Table 10 shows the cash flow table for the SEK fixed-for-floating rate swap shown in FIG. 3.

TABLE 10

The cash flow table of a plain vanilla SEK fixed-for-floating rate swap.

| Date | Currency SEK |
| --- | --- |
| 2009-08-05 | −2 574 + 3 603 |
| 2009-11-05 | −2 037 + 3 603 |
| 2010-02-05 | −2 535 + 3 603 |
| 2010-05-05 | −2 732 + 3 486 |
| 2010-08-05 | −3 616 + 3 603 |
| 2010-11-05 | −4 340 + 3 603 |
| 2011-02-05 | −5 220 + 3 603 |

TABLE 10-continued

The cash flow table of a plain vanilla SEK fixed-for-floating rate swap.

| Date | Currency SEK |
|---|---|
| 2011-05-05 | −5 525 + 3 486 |

Net Present Value Calculation

In the next step of NOMX CFM method a new row is added to the cash flow table. This row contains the NPV of the future cash flows per currency. It should be noted that if the NPV calculations are performed with each currencies unstressed swap zero curve the market value of the future cash flows is obtained per currency.

Adding a margining aspect to the NPV calculations requires stressing of the yield curves. The Historical Simulation and the Principal Components approach to the yield curve stressing can be applied in this context as well. However, the preferred method for stressing the yield curves will be the Rolling Value method. This text presents how the Rolling Value method can be applied on interest rate swaps.

Rolling Value Method

In this method the swap forward curve is shifted in a rolling fashion starting with the cash flow furthest away. The NPV of one currency's future cash flows is given by equation (19).

$$NPV = \sum_{i=1}^{n} p(t_1) \cdot p(t_1, t_2) \cdot \ldots \cdot p(t_{i-2}, t_{i-1}) \cdot p(t_{i-1}, t_i) \cdot C_i \quad (19)$$

$$= p(t_1) \cdot \left[ C_1 + p(t_1, t_2) \cdot \left[ C_2 + p(t_2, t_3) \cdot \left[ \ldots \left[ C_{n-1} + p(t_{n-1}, t_n) \cdot C_n \right] \right] \right] \right]$$

$p(t_1)$ is the discount function from today to $t_1$ and it is given by the swap zero rate $r_z(t_1) \cdot p(t_i, t_{i+1})$ is the discount function from $t_{i+1}$ to $t_i$ and it is given by the swap forward rate $r_f(t_i, t_{i+1})$.

$$p(t_1) = \frac{1}{1 + r_z(t_1) \cdot \frac{\Delta t_{0,1}}{360}} \quad (20)$$

$$p(t_1, t_{i+1}) = \frac{1}{1 + r_f(t_1, t_{i+1}) \cdot \frac{\Delta t_{i,i+1}}{360}} \quad (21)$$

A fixed cash flow is always exposed to a shift in the forward curve $r_f(t_i, t_{i+1})$. However, the complete floating cash flow is not exposed to a shift in the forward curve since the same forward curve is used to determine the size of the floating cash flow. A floating cash flow can therefore always be divided into one part that is exposed to shifts in the forward curve and one part that is unaffected by shifts in the forward curve.

TABLE 11

Division of a floating cash flow.

| Floating Cash Flow | = | Non Exposed Part | + | Exposed Part |
|---|---|---|---|---|
| $Q \cdot \left( (r_f(t_i, t_{i+1}) + \Delta r_f) \cdot \frac{\Delta t_{i,i+1}}{360} \right) \cdot N$ | = | $Q \cdot \left( 1 + r_f(t_i, t_{i+1}) \cdot \frac{\Delta t_{i,i+1}}{360} \right) \cdot N$ | + | $Q \cdot \left( \Delta r_f \cdot \frac{\Delta t_{i,i+1}}{360} - 1 \right) \cdot N$ |

Let us introduce a term that represents "all previously discounted cash flows".

$$CC_i = C_i + p(t_i, t_{i+1}) CC_{i+1} \quad (22)$$

$CC_i$ can always be divided into one part that is exposed to shifts in the forward curve, $CC_i^{exp}$, and another part is unaffected by shifts in the forward curve, $CC_i^{non}$.

$$CC_i = CC_i^{exp} + CC_i^{non} \quad (23)$$

In the rolling value method the forward curve is stressed with a risk parameter, rp, depending on the sign of $CC_i^{exp}$.

$$r_f(t_{i-1}, t_i) = r_f(t_{i-1}, t_i) + rp \cdot \text{sign}(CC_i^{exp}) \quad (24)$$

This means that the last cash flow is discounted back to the one before dependent on sign of its exposed part. For the next step the discounted cash flow and the cash flow at that point is added together and dependent on sign of this cash flow's exposed part then discounted back to the cash flow before that. When the last cash flow is reached, on time $t_1$, the discounting must be performed with $p(t_1)$ in order to obtain the present value. At this stage the complete $CC_i$ will be exposed to a shift in the zero rate, $r_z(t_1)$, and hence $r_z(t_1)$ should be stressed depending on sign of $CC_i$.

$$r_z(t_1) = r_z(t_1) + rp \cdot \text{sign}(CC_i) \quad (25)$$

When the rolling value method has calculated the NPV of the future cash flows it has at the same time produced the stressed swap forward rates $r_f(t_i, t_{i+1})$ as well as the stressed swap zero rate $r_z(t_1)$. Equation (13) can now be used to obtain the complete stressed swap zero curve. Hence, the rolling value method produces the stressed yield curves in conjunction with performing the NPV calculations as opposed to the other methods that first construct a number of different yield curves and then performs the NPV calculations in order to select the worst curves.

Spot Exchange Rate Stressing

The stressing of the swap yield curves gives a NPV of the future cash flows per currency. In the last step of NOMX CFM method the net present valued cash flows are converted into the margin base currency. The spot exchange rates are stressed in this conversion. The window method will be applied to account for correlation between different exchange rates.

Margin Examples

This section contains examples of how method according to an embodiment (NOMX CFM method) of the present invention would calculate margins for two different swap portfolios.

Sold 2Y Fixed-for-Floating

Consider a portfolio that consists of one sold contract of a two year SEK fixed-for-floating rate swap.

[1 000 000, 1, 2009-05-05, 2011-05-05, 3M, 3M, 1,41%, −3M STIB, simple, simple, 0, 0, SEK, SEK, YES, 1].

This implies that every third month a 1,41% fixed rate is received in exchange for the 3 month STIBOR rate. Suppose that the contract is entered on 2009-05-05 and that the swap zero rates, $r_z(t_i)$, on this day is as given in Table 12. Equation (13) can be used to produce the SEK swap forward curve $r_f(t_i, t_{i+1})$.

TABLE 12

The SEK swap zero rates and the SEK swap forward rates as of 2009-05-05.

| T | $r_z(t_i)$ | $r_f(t_i, t_{i+1})$ |
|---|---|---|
| 2009-08-08 | 1.01% | 0.80% |
| 2009-11-05 | 0.90% | 0.99% |
| 2010-02-05 | 0.93% | 1.11% |
| 2010-05-05 | 0.99% | 1.41% |
| 2010-08-05 | 1.07% | 1.70% |
| 2010-11-05 | 1.18% | 2.04% |
| 2011-02-05 | 1.31% | 2.23% |
| 2011-05-05 | 1.43% | — |

The rates in Table 12 should be interpreted as follows.

$r_z(2010\text{-}05\text{-}05)=0.99\%$ implies that the one year swap zero rate from 2009-05-05 equals 0.99%.

$r_f(2011\text{-}02\text{-}05, 2011\text{-}05\text{-}05)=2/23\%$ implies that the 3 month swap forward rate ranging between 2011-02-05 and 2011-05-05 equals 2.23%.

Cash Flow Table

The rates in Table 13 can be used together with Equation (15)-(18) in order to create the cash flow table.

TABLE 13

The cash flow table divided into floating and fixed cash flows.

| T | SEK Floating Cash Flows | SEK Fixed Cash Flows |
|---|---|---|
| 2009-08-08 | −0.0101 · 92/360 · 1 000 000 = −2 574 | 0.0141 · 92/360 · 1 000 000 = 3 603 |
| 2009-11-05 | −0.008 · 92/360 · 1 000 000 = −2 037 | 0.0141 · 92/360 · 1 000 000 = 3 603 |
| 2010-02-05 | −0.0099 · 92/360 · 1 000 000 = −2 535 | 0.0141 · 92/360 · 1 000 000 = 3 603 |
| 2010-05-05 | −0.0111 · 89/360 · 1 000 000 = −2 732 | 0.0141 · 89/360 · 1 000 000 = 3 486 |
| 2010-08-05 | −0.0141 · 92/360 · 1 000 000 = −3 616 | 0.0141 · 92/360 · 1 000 000 = 3 603 |
| 2010-11-05 | −0.017 · 92/360 · 1 000 000 = −4 340 | 0.0141 · 92/360 · 1 000 000 = 3 603 |
| 2011-02-05 | −0.0204 · 92/360 · 1 000 000 = −5 220 | 0.0141 · 92/360 · 1 000 000 = 3 603 |
| 2011-05-05 | −0.0223 · 89/360 · 1 000 000 = −5 525 | 0.0141 · 89/360 · 1 000 000 = 3 486 |

Net Present Value Calculation

The floating cash flow on day $t_i$ can be divided in one part that is exposed to and another part that is not exposed to shifts in $r_f(t_i, t_{i+1})$. The cash flow table can therefore be divided into a non-exposed and an exposed part.

TABLE 14

The cash flow table divided into a non-exposed and an exposed part.

| T | SEK Non-Exposed Cash Flows | SEK Exposed Cash Flows |
|---|---|---|
| 2009-08-08 | 0 | −(1 + 0.0101) · 92/360 · 1 000 000 = −1 002 574 + (1 + 0.0141) · 92/360 · 1 000 000 = 1 003 603 = 1 049 |
| 2009-11-05 | −(1 + 0.008 · 92/360) · 1 000 000 = −1 002 037 | (1 + 0.0141 · 92/360) · 1 000 000 = 1 003 603 |
| 2010-02-05 | −(1 + 0.0099 · 92/360) · 1 000 000 = −1 002 535 | (1 + 0.0141 · 92/360) · 1 000 000 = 1 003 603 |
| 2010-05-05 | −(1 + 0.0111 · 89/360) · 1 000 000 = −1 002 732 | (1 + 0.0141 · 89/360) · 1 000 000 = 1 003 486 |
| 2010-08-05 | −(1 + 0.0141 · 92/360) · 1 000 000 = −1 003 616 | (1 + 0.0141 · 92/360) · 1 000 000 = 1 003 603 |
| 2010-11-05 | −(1 + 0.017 · 92/360) · 1 000 000 = −1 004 340 | (1 + 0.0141 · 92/360) · 1 000 000 = 1 003 603 |
| 2011-02-05 | −(1 + 0.0204 · 92/360) · 1 000 000 = −1 005 220 | (1 + 0.0141 · 92/360) · 1 000 000 = 1 003 603 |
| 2011-05-05 | −(1 + 0.0223 · 89/360) · 1 000 000 = −1 005 525 | (1 + 0.0141 · 89/360) · 1 000 000 = 1 003 486 |

The rolling value method starts with the cash flows furthest away i.e. on 2011-05-05. These cash flows are discounted back to the time of the next cash flow i.e. to 2011-02-05 using the forward rate between 2011-02-05 and 2011-05-05, $r_f(2011\text{-}02\text{-}05, 2011\text{-}05\text{-}05)$. The forward rate is stressed with a risk parameter depending on the sign of the exposed part of the cash flow from 2011-05-05. In this example it is supposed that the risk parameter is set to 20 basis points.

$CC_{2011\text{-}05\text{-}05}^{exp}$ i.e. the exposed cash flow on 2011-05-05 is equal to SEK 1 003 486>0. Hence, the forward curve shall be stressed upward in order to make $CC_{2011\text{-}05\text{-}05}^{exp}$ as small as possible.

$$CC_{2011-02-05}^{exp} = C_{2011-02-05}^{exp} + \frac{1}{1 + (0,0223 + 0,0020) \cdot \frac{89}{360}} \cdot$$

$$(CC_{2011-05-05}^{non} + CC_{2011-05-05}^{exp})$$

$$= \left(1 + 0,014 \cdot \frac{92}{360}\right) \cdot 1000000 -$$

$$\frac{\left(1 + (0,0223 + 0,0020) \cdot \frac{89}{360}\right) \cdot 1000000}{\left(1 + (0,0223 + 0,0020) \cdot \frac{89}{360}\right)} +$$

$$\frac{\left(1 + (0,014 + 0,0020) \cdot \frac{89}{360}\right) \cdot 1000000}{\left(1 + (0,0223 + 0,0020) \cdot \frac{89}{360}\right)}$$

$CC_{2011\text{-}02\text{-}05}^{exp}$ becomes equal to 1 001 085>0 and hence $r_f(2010\text{-}11\text{-}05, 2011\text{-}02\text{-}05)$ shall also be stressed upward. This procedure is repeated until the last cash flow is reached on 2009-08-08.

In order to obtain the NPV of the future cash flows $CC_{2009\text{-}08\text{-}05}$ must be discounted back using the swap zero rate $r_z(2009\text{-}08\text{-}05)$. It should be noted that the complete $CC_{2009\text{-}08\text{-}05}$ is exposed to shifts in $r_z(2009\text{-}08\text{-}05)$ and hence it should be shifted based on the sign of $CC_{2009\text{-}08\text{-}05}$.

$CC_{2009\text{-}08\text{-}05}$=SEK−3 388<0 and hence $r_z(2009\text{-}08\text{-}05)$ should be shifted downward.

$$NPV = \frac{1}{1 + (0{,}0101 - 0{,}002) \cdot \frac{92}{360}} \cdot CC_{2009-08-05}$$

$$= SEK - 3381.$$

This is equal to the margin requirement in SEK.

TABLE 15

CC$_i$ for different dates.

| T | CC$_i^{non}$ | CC$_i^{exp}$ | CC$_i$ | Stressing of r$_f$(t$_i$, t$_{i+1}$) | Stressing of r$_z$(t) |
|---|---|---|---|---|---|
| 2009-08-08 | 0 | −3 380 | −3 380 | | Downward |
| 2009-11-05 | −1 002 037 | 998 120 | −3 917 | Upward | |
| 2010-02-05 | −1 002 535 | 997 546 | −4 989 | Upward | |
| 2010-05-05 | −1 002 732 | 997 149 | −5 583 | Upward | |
| 2010-08-05 | −1 003 616 | 997 764 | −5 852 | Upward | |
| 2010-11-05 | −1 004 340 | 998 983 | −5 357 | Upward | |
| 2011-02-05 | −1 005 220 | 1 001 085 | −4 135 | Upward | |
| 2011-05-05 | −1 005 525 | 1 003 486 | −2 039 | Upward | |

It should be noted that since all stressed forward rates and the first stressed zero rate is obtained Equation (13) can be used in order to construct the stressed swap zero curve. All swap curves are shown in FIG. 4 and FIG. 5.

Figure 4:
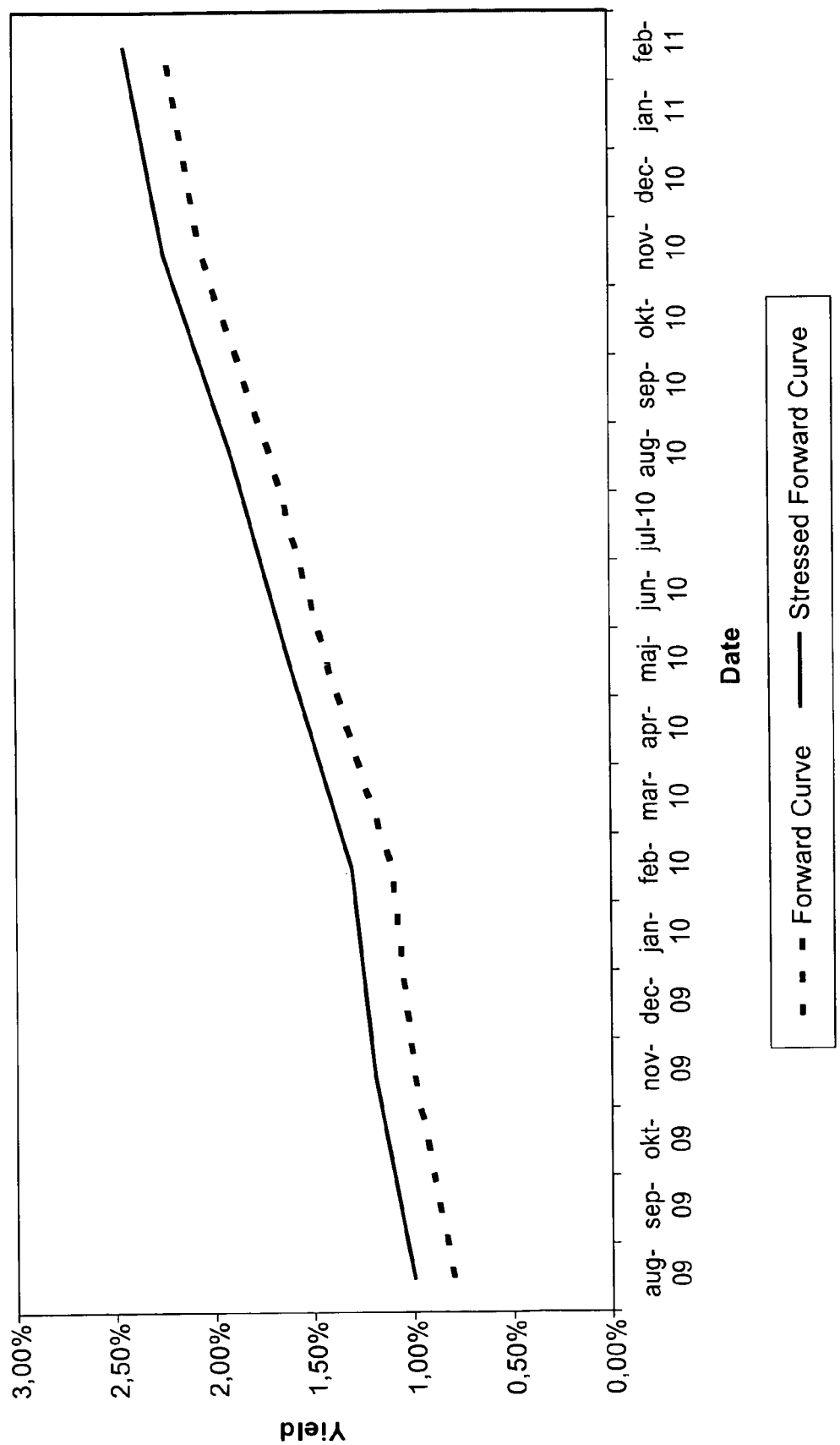
FIG. 4 illustrates a stressed swap forward curve.

FIG. 4: The stressed swap forward curve.

Figure 5:
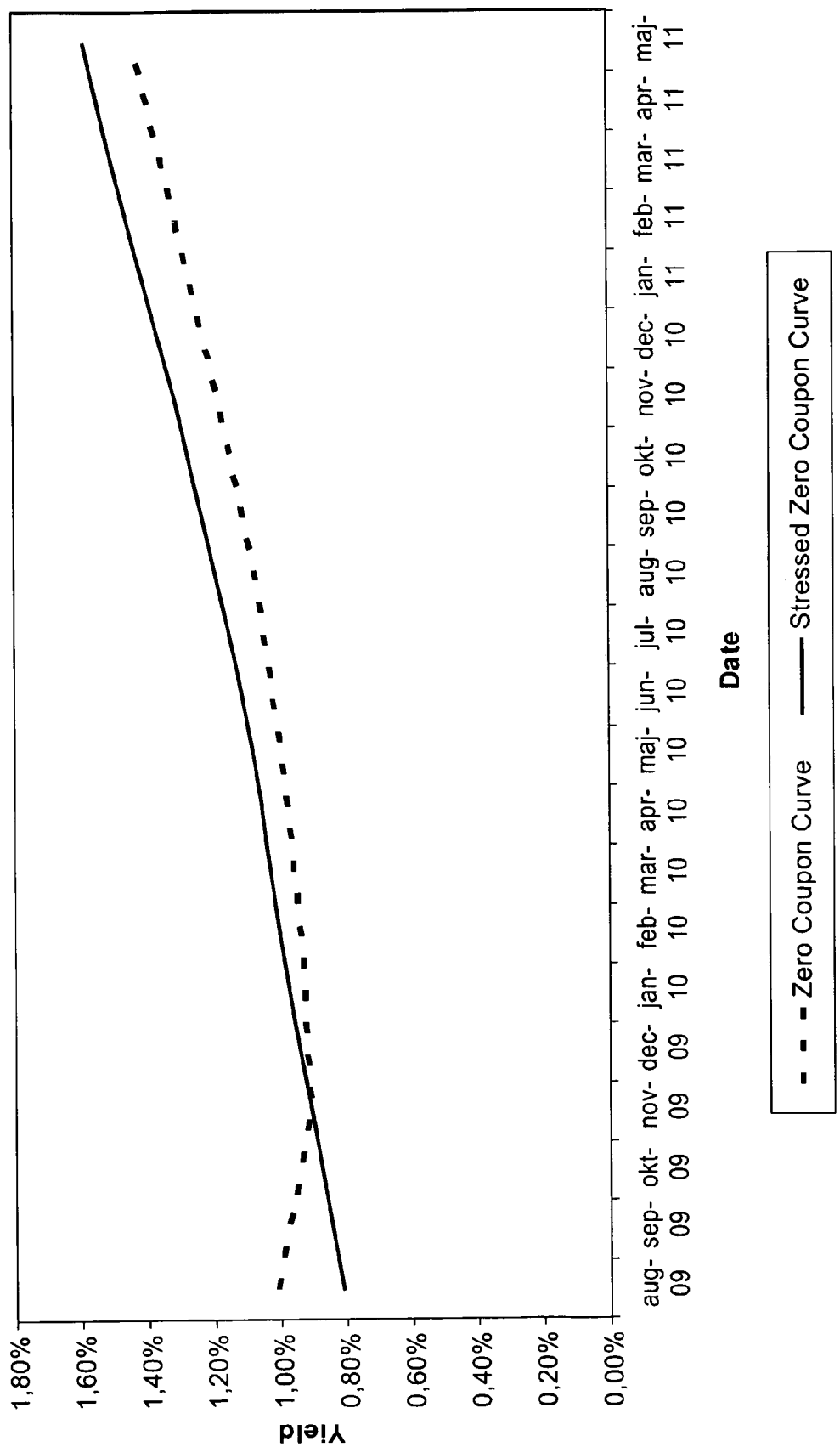
FIG. 5 illustrates a stressed swap zero curve.

FIG. 5: The stressed swap zero curve.

Summary

The swap forward curve was stressed upward between 2009-08-05 and 2011-05-08 since CC$_i^{exp}$>0 between these dates. On 2009-08-05 the floating leg did however become exposed to a shift in the swap zero rate and this made change sign. The swap zero rate, r$_z$(2009-08-08), was therefore stressed downward.

If the NPV of the future cash flow is calculated with the unstressed curves the market value of the swap portfolio is obtained. Table 16 lists the swap portfolio's market value together with the calculated margin.

TABLE 16

The market value and margin of one sold contract of a 2Y fixed-for-floating rate swap.

| Market Value | Margin |
|---|---|
| SEK 95 | SEK −3 381 |

Bought 5Y Fixed-for-Floating versus Sold 2Y Fixed-for-Floating

Consider a portfolio that consists of one bought contract of a five year SEK fixed-for-floating rate swap versus one sold contract of a two year SEK fixed-for-floating rate swap.

[1 000 000, 1, 2009-05-05, 2014-05-05, 3M, 3M, −2.52%, 3M STIB, simple, simple, 0, 0, SEK, SEK, YES, 1].

[1 000 000, 1, 2009-05-05, 2011-05-05, 3M, 3M, 1.4%, −3M STIB, simple, simple, 0, 0, SEK, SEK, YES, 1].

Suppose that the contracts are entered on 2009-05-05 and that the swap zero rates, r$_z$(t$_i$), on this day is as given in Table 17. Equation (13) can be used to produce the SEK swap forward curve r$_f$(t$_i$,t$_{i+1}$).

TABLE 17

The SEK swap zero rates and the SEK swap forward rates as of 2009-05-05.

| T | r$_z$(t$_i$) | r$_f$(t$_i$,t$_{i+1}$) |
|---|---|---|
| 2009-08-08 | 1.01% | 0.80% |
| 2009-11-05 | 0.90% | 0.99% |
| 2010-02-05 | 0.93% | 1.11% |
| 2010-05-05 | 0.99% | 1.41% |
| 2010-08-05 | 1.07% | 1.70% |
| 2010-11-05 | 1.18% | 2.04% |
| 2011-02-05 | 1.31% | 2.23% |
| 2011-05-05 | 1.43% | 2.71% |
| 2011-08-05 | 1.58% | 2.91% |
| 2011-11-05 | 1.72% | 3.07% |
| 2012-02-05 | 1.86% | 3.20% |
| 2012-05-05 | 1.99% | 3.40% |
| 2012-08-05 | 2.11% | 3.41% |
| 2012-11-05 | 2.22% | 3.48% |
| 2013-02-05 | 2.32% | 3.40% |
| 2013-05-05 | 2.41% | 3.62% |
| 2013-08-05 | 2.50% | 3.53% |
| 2013-11-05 | 2.58% | 3.55% |
| 2014-02-05 | 2.65% | 3.47% |
| 2014-05-05 | 2.72% | — |

Figure 6:
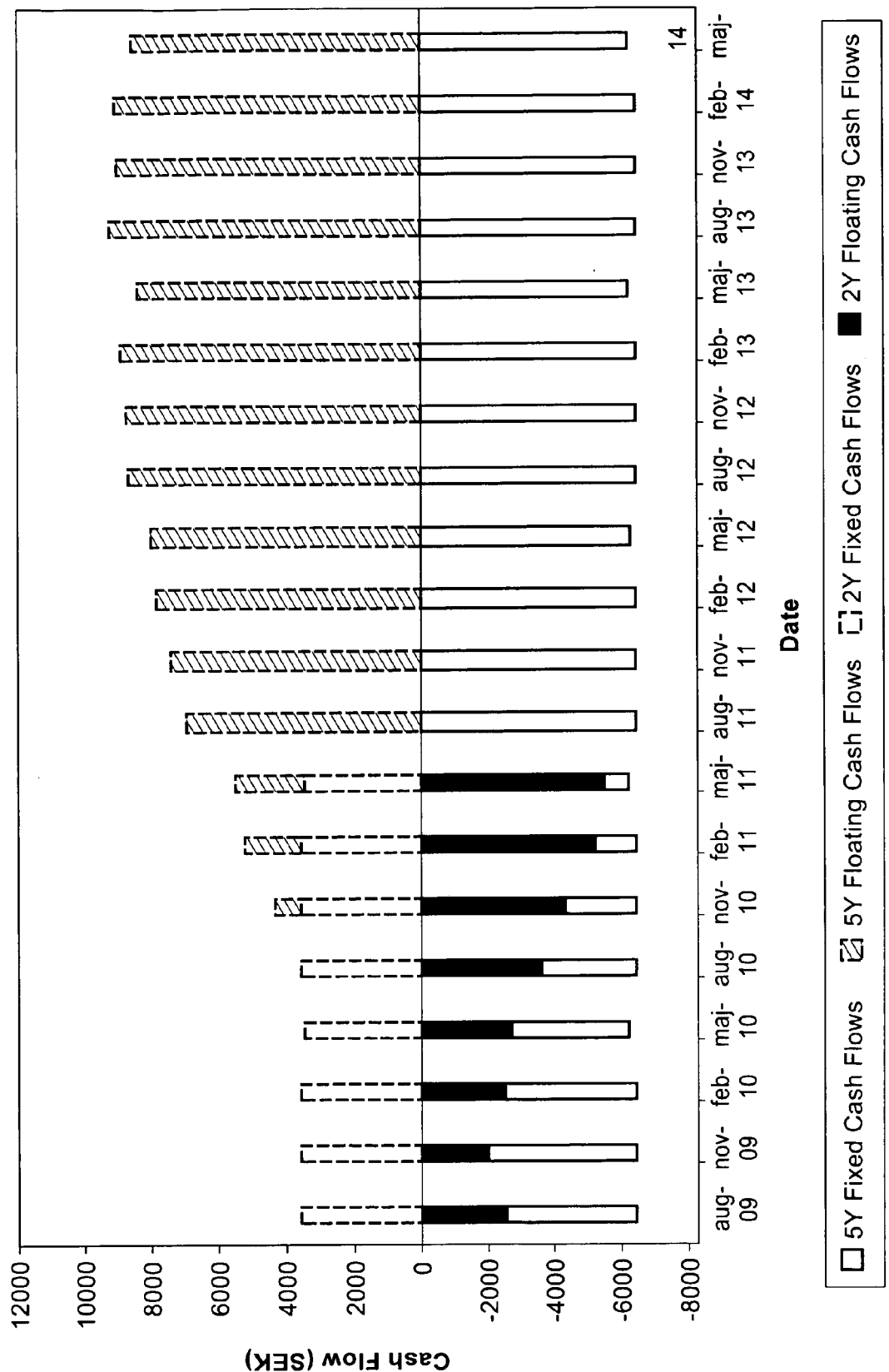
FIG. 6 illustrates future cash flows of the swap portfolio.

FIG. 6: The future cash flows of the swap portfolio.

The same calculations as in the previous example would give the following CC$_i$ values.

TABLE 18

CC$_i$ for different dates.

| T | CC$_i^{non}$ | CC$_i^{exp}$ | CC$_i$ | Stressing of r$_f$(t$_i$, t$_{i+1}$) | Stressing of r$_z$(t) |
|---|---|---|---|---|---|
| 2009-08-08 | 0 | −5 505 | −5 505 | | Downward |
| 2009-11-05 | 0 | −2 686 | −2 686 | Downward | |
| 2010-02-05 | 0 | 139 | 139 | Upward | |
| 2010-05-05 | 0 | 2 972 | 2 972 | Upward | |
| 2010-08-05 | 0 | 5 727 | 5 727 | Upward | |
| 2010-11-05 | 0 | 8 593 | 8 593 | Upward | |
| 2011-02-05 | 0 | 11 482 | 11 482 | Upward | |
| 2011-05-05 | 0 | 14 392 | 14 392 | Upward | |
| 2011-08-05 | 1 006 931 | −989 186 | 17 745 | Downward | |
| 2011-11-05 | 1 007 428 | −989 556 | 17 872 | Downward | |
| 2012-02-05 | 1 007 844 | −990 338 | 17 506 | Downward | |
| 2012-05-05 | 1 008 003 | −991 293 | 16 709 | Downward | |
| 2012-08-05 | 1 008 698 | −993 070 | 15 628 | Downward | |
| 2012-11-05 | 1 008 710 | −994 732 | 13 977 | Downward | |
| 2013-02-05 | 1 008 887 | −996 583 | 12 304 | Downward | |
| 2013-05-05 | 1 008 412 | −997 995 | 10 417 | Downward | |
| 2013-08-05 | 1 009 243 | −1 000 438 | 8 805 | Downward | |

TABLE 18-continued

CC_i for different dates.

| T | $CC_i^{non}$ | $CC_i^{exp}$ | $CC_i$ | Stressing of $r_f(t_i, t_{i+1})$ | Stressing of $r_z(t)$ |
|---|---|---|---|---|---|
| 2013-11-05 | 1 009 014 | −1 002 463 | 6 551 | Downward | |
| 2014-02-05 | 1 009 079 | −1 004 569 | 4 509 | Downward | |
| 2014-05-05 | 1 008 585 | −1 006 218 | 2 367 | Downward | |

Figure 7:
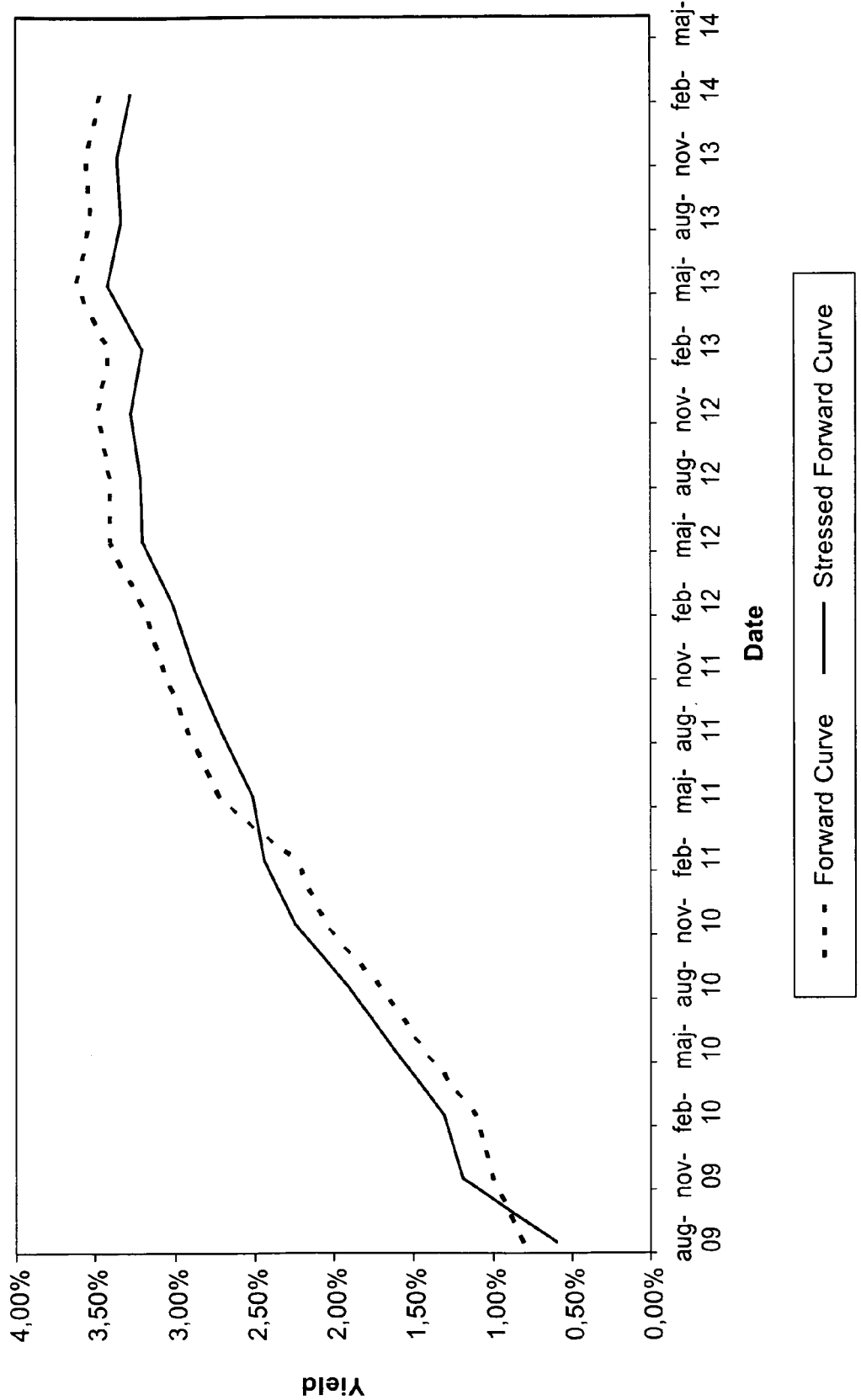
FIG. 7 illustrates a stressed swap forward curve.
Figure 8:
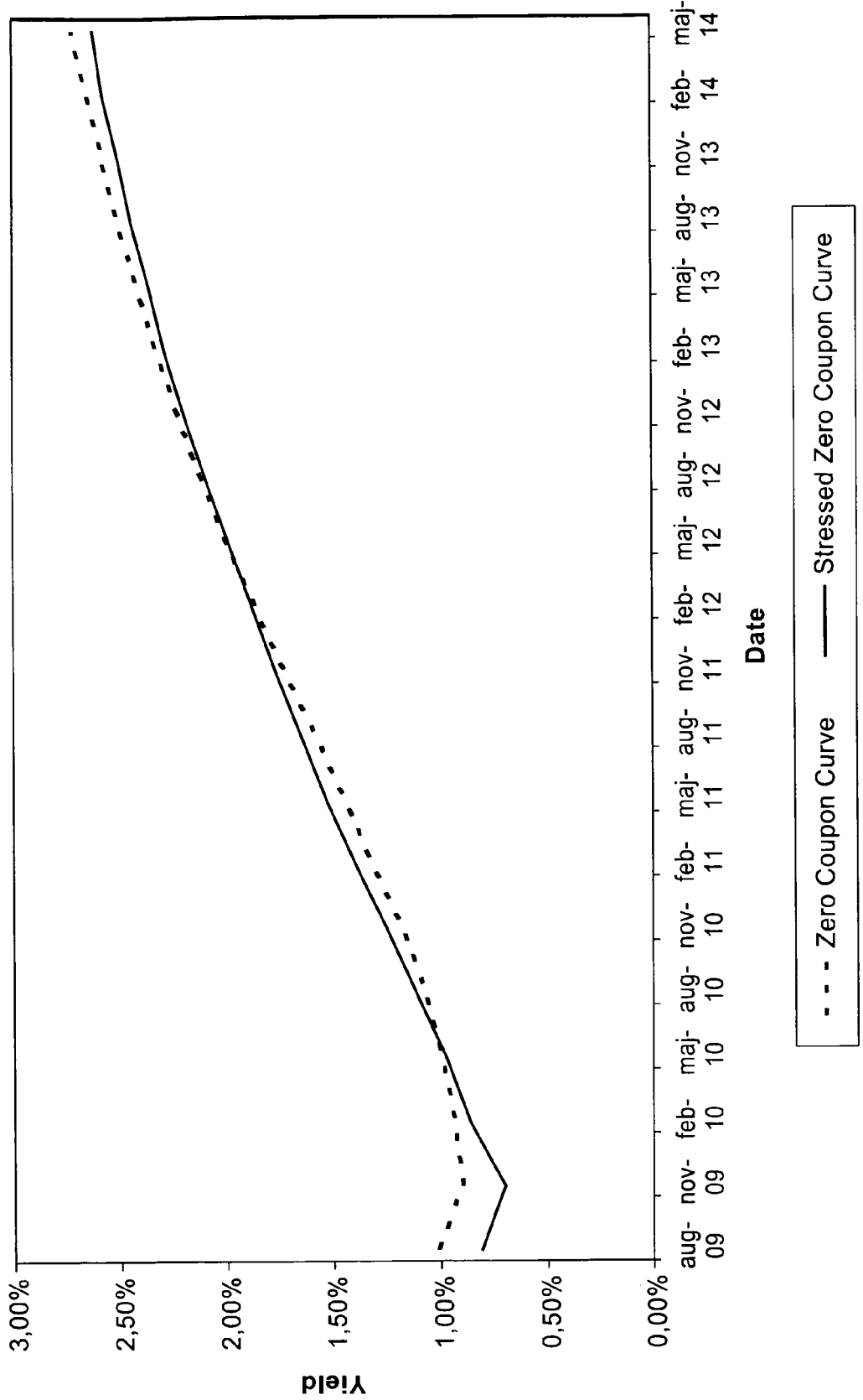
FIG. 8 illustrates a stressed swap zero curve.

FIG. 7: The stressed swap forward curve.
FIG. 8: The stressed swap zero curve.
Summary The swap forward curve was stressed downward between 2011-08-05 and 2014-05-05 when there were only cash flows from the five year swap contract in the cash flow table. Between 2009-08-05 and 2011-05-05 the cash flows from the two year swap contract were also exposed to shifts in the swap forward curve and the positive sign of the fixed leg cash flows of the two year swap made the sign of $CC_i^{exp}$ change on 2011-05-05. The forward curve was therefore stressed upward between 2010-02-05 and 2011-05-05. However, since the fixed leg of the five year swap contract had a higher traded yield then the fixed leg of the two year swap contract, $CC_i^{exp}$ gradually decreased and on 2009-11-05 the sign of $CC_i^{exp}$ was changed and the forward curve as well as the zero curve were stressed downward.

Table 19 shows the swap portfolio's market value and the margin produced by the rolling value method as well as by parallel shifting the swap curves upwards and downward.

TABLE 19

The swap portfolio's market value and margin.

| Market Value | Margin (Rolling Value) | Margin (Parallel Shift Upward) | Margin (Parallel Shift Downward) |
|---|---|---|---|
| SEK 85 | SEK −5 494 | SEK 5 540 | SEK −5 451 |

Figure 10:
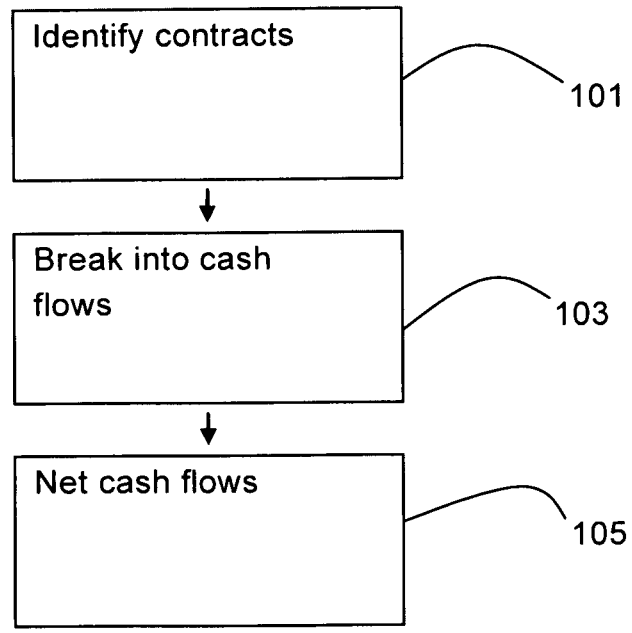
FIG. 10 illustrates procedural steps of a computerized method for calculating margin requirements implemented on a computer system.

In FIG. 10 some procedural steps of a computerized method for calculating margin requirements implemented on a computer system are illustrated. The computer system can comprise a memory comprising contracts and a processor associated with the memory. In accordance with the method contracts in the memory are first identified in a step 101. The identified individual contracts are then broken into its respective cash flows in a step 103. The cash flows of one contract resulting from step 103 can then be netted against cash flows from other contracts in a step 105. The margin requirements can then be calculated based on the netted cash flows.

In the above description the term "comprising" does not exclude other elements or steps and "a" or "an" does not exclude a plurality.

Furthermore the terms "include" and "contain" does not exclude other elements or steps.

The invention claimed is:

1. A computer system for calculating a margin requirement value for a user account, the computer system comprising:
a memory comprising information related to at least one contract associated with the user account; and
a processor coupled to the memory and configured to extract, from the memory, the information and determine at least one future payment value for each contract, each future payment value associated with a currency and a payment date,
wherein the processor is further configured to perform functionality comprising:
calculating a present value for each future payment value,
calculating for each currency a net present value by aggregating each present value associated with the currency, and
calculating the margin requirement value for the user account by aggregating each net present value.

2. The computer system according to claim 1, wherein the processor is further configured to perform functionality comprising aggregating, for each payment date, each present value associated with the payment date before calculating for each currency the net present value.

3. The computer system according to claim 1, wherein the processor is further configured to perform functionality comprising:
receiving an interest rate curve related to estimated interest rates at future points in time; and
determining, for each future payment value, an interest rate based on the interest rate curve and the payment date associated with the future payment value.

4. The computer system according to claim 1, wherein the processor is further configured to perform functionality comprising converting each net present value from the currency associated with the net present value into a base currency before calculating the margin requirement value.

5. The computer system according to claim 4, wherein the conversion is based on a spot exchange rate and a scanning range parameter.

6. The computer system according to claim 1, wherein the computer system is a clearing house computer system.

7. A computerized method for calculating a margin requirement value for a user account, the computerized method implemented on a computer system having a memory comprising information related to at least one contract associated with the account and a processor coupled to the memory, the method comprising:
extracting from the memory, by the processor, the information related to the at least one contract;
determining, by the processor, at least one future payment value for each contract, each future payment value associated with a currency and a payment date;
calculating, by the processor, a present value for each future payment value;
calculating, by the processor, for each currency a net present value by aggregating each present value associated with the currency; and
calculating the margin requirement value for the user account by aggregating, by the processor, each net present value.

8. The computerized method according to claim 7, further comprising aggregating, for each payment date, by the processor, each present value associated with the payment date before calculating for each currency the net present value.

9. The computerized method according to claim 7, further comprising:
receiving, by the processor, an interest rate curve related to estimated interest rates at future points in time; and
determining, by the processor, for each future payment value an interest rate based on the interest rate curve and the payment date associated with the future payment value.

10. The computerized method according to claim 7, further comprising converting, by the processor, each net present value from the currency associated with the net present value into a base currency before calculating the margin requirement value.

11. The computerized method according to claim 10, wherein the conversion is based on a spot exchange rate and a scanning range parameter.

12. The computerized method according to claim 7, further comprising applying, by the processor, a scanning range parameter to each net present value before calculating the margin requirement value for the user account.

* * * * *